United States Patent
Medalsy

(10) Patent No.: US 11,858,199 B2
(45) Date of Patent: Jan. 2, 2024

(54) METHODS AND SYSTEMS FOR PHOTOCURING LIQUID WITH REDUCED HEAT GENERATION USING A DIGITAL LIGHT PROCESSING (DLP) LIGHT SOURCE

(71) Applicant: NEXA3D INC., Ventura, CA (US)

(72) Inventor: Izhar Medalsy, Ventura, CA (US)

(73) Assignee: NEXA3D INC., Ventura, CA (US)

( * ) Notice: Subject to any disclaimer, the term of this patent is extended or adjusted under 35 U.S.C. 154(b) by 0 days.

(21) Appl. No.: 17/931,784

(22) Filed: Sep. 13, 2022

(65) Prior Publication Data

US 2023/0119050 A1     Apr. 20, 2023

Related U.S. Application Data

(60) Provisional application No. 63/262,674, filed on Oct. 18, 2021.

(51) Int. Cl.
*B29C 64/286*     (2017.01)
*B29C 64/129*     (2017.01)
(Continued)

(52) U.S. Cl.
CPC .......... *B29C 64/129* (2017.08); *B29C 64/232* (2017.08); *B29C 64/245* (2017.08);
(Continued)

(58) Field of Classification Search
CPC .................................................. B29C 64/286
See application file for complete search history.

(56) References Cited

U.S. PATENT DOCUMENTS

| | | | | |
|---|---|---|---|---|
| 4,752,498 A | * | 6/1988 | Fudim ................ | G03F 7/70416 |
| | | | | 118/620 |
| 4,801,477 A | * | 1/1989 | Fudim ................ | G03F 7/0037 |
| | | | | 430/269 |

(Continued)

FOREIGN PATENT DOCUMENTS

| | | | | |
|---|---|---|---|---|
| EP | 3726293 A1 | 10/2020 | | |
| WO | WO-9600422 A1 | * | 1/1996 | ........... B29C 67/007 |

(Continued)

OTHER PUBLICATIONS

Swargiary; et al., "Single-step 3D-printed integrated optical system and its implementation for a sensing application using digital light processing technology", Applied Optics (Jan. 1, 2020), 59(1): 122-128.

(Continued)

*Primary Examiner* — Atul P. Khare
(74) *Attorney, Agent, or Firm* — ASCENDA LAW GROUP, PC

(57) ABSTRACT

In vat polymerization printer, light is projected from a digital light processing (DLP) light source towards an opening in a tank containing photo-curable liquid resin. A mask is used to filter the light from the DLP light source, the mask having pixels configurable to be individually transparent or opaque to portions of the light from the DLP light source. In a build area of the tank, the filtered light is used to cure the photo-curable liquid resin so as to form a layer of a partially formed object. The operation of the DLP light source is synchronized with the operation of the mask, such that light from the DLP light source with high intensity is transmitted through the transparent pixels of mask and light from DLP light source with low intensity is blocked by the opaque pixels of mask. The mask may enhance the resolution of DLP light source.

20 Claims, 5 Drawing Sheets

(51) Int. Cl.
  B33Y 10/00 (2015.01)
  B33Y 30/00 (2015.01)
  B29C 64/232 (2017.01)
  B29C 64/245 (2017.01)
  B29C 64/393 (2017.01)
  B33Y 50/02 (2015.01)
  B33Y 80/00 (2015.01)

(52) U.S. Cl.
  CPC .......... B29C 64/286 (2017.08); B29C 64/393 (2017.08); B33Y 10/00 (2014.12); B33Y 30/00 (2014.12); B33Y 50/02 (2014.12)

(56) References Cited

U.S. PATENT DOCUMENTS

| | | | |
|---|---|---|---|
| 10,203,762 | B2 | 2/2019 | Bradski et al. |
| 10,328,634 | B2* | 6/2019 | Zitelli ................ B29C 37/0075 |
| 2015/0328833 | A1 | 11/2015 | Liu et al. |
| 2018/0126647 | A1 | 5/2018 | Schultheiss |
| 2019/0129308 | A1* | 5/2019 | Klimczak ............ G02B 27/145 |
| 2019/0270242 | A1* | 9/2019 | Medalsy ............... B29C 64/255 |
| 2019/0291340 | A1* | 9/2019 | Medalsy ............... B29C 64/264 |
| 2020/0055251 | A1* | 2/2020 | Medalsy ................ B29C 64/20 |
| 2020/0298471 | A1* | 9/2020 | Medalsy ............... B29C 64/129 |
| 2020/0353687 | A1* | 11/2020 | Medalsy ................ G06F 30/20 |
| 2021/0146627 | A1* | 5/2021 | Medalsy ............... B33Y 10/00 |
| 2021/0156779 | A1* | 5/2021 | Medalsy ............... B33Y 10/00 |

FOREIGN PATENT DOCUMENTS

| | | | | |
|---|---|---|---|---|
| WO | WO-9806560 | A1 * | 2/1998 | .......... B29C 64/124 |
| WO | WO-0100390 | A1 * | 1/2001 | .......... B29C 64/129 |

OTHER PUBLICATIONS

Swargiary, Kankan, "3D Printed Optical System Based on Digital Light Processing Technology for Sensing Applications", Bangkok University, thesis (2021), 186 pgs.

International Search Report and Written Opinion dated Dec. 1, 2022, from the ISA/European Patent Office, for International Patent Application No. PCT/US2022/043347 (filed Sep. 13, 2022), 13 pgs.

* cited by examiner

METHODS AND SYSTEMS FOR PHOTOCURING LIQUID WITH REDUCED HEAT GENERATION USING A DIGITAL LIGHT PROCESSING (DLP) LIGHT SOURCE

RELATED APPLICATIONS

This application is a non-provisional patent application of and claims priority to U.S. Provisional Application No. 63/262,674, filed 18 Oct. 2021, which is incorporated by reference herein.

FIELD OF THE INVENTION

The present invention relates to the printing of three-dimensional objects, and more particularly relates to reducing the heat imparted into the liquid resin by the light source.

BACKGROUND

One obstacle encountered in the three-dimensional printing of objects that involves the curing of photo-curable liquid resin is the heating of the liquid resin. Not only is the curing of the liquid resin an exothermic reaction (which locally heats regions of the liquid resin where the curing takes place), but the irradiation of the mask by a light source, typically an ultra-violet (UV) light source, also causes heating of the mask. As the mask is located in close proximity to the liquid resin, any heating of the mask also leads to the further heating of the liquid resin.

If the liquid resin temperature exceeds a critical temperature, portions of the resin may start to cure even in the absence of UV light, leading to defects in the printed objects. In prior approaches, to prevent the liquid resin temperature from exceeding this critical temperature, the printing process may be periodically halted to allow the liquid resin to cool, with the consequence of reducing the throughput of the printing process. Also in prior approaches, a resin circulatory system may be employed to cool the heated resin. While heat removal via a resin circulatory system may effectively achieve the desired effect of controlling the liquid resin temperature, approaches described herein control the temperature of the liquid resin through other or additional means.

SUMMARY OF THE INVENTION

In one embodiment of the invention, the need to cool the liquid resin is reduced by reducing the degree to which the liquid resin is heated. While the heating of the liquid resin due to the exothermic reaction that takes place during the curing of resin cannot be avoided, the heating of the mask can be reduced by selectively illuminating only regions of the mask with transparent pixels and/or minimizing the illumination of the regions of the mask with opaque pixels.

In one embodiment of the invention, light may be projected from a digital light processing (DLP) light source towards an opening in a tank containing photo-curable liquid resin. A mask may be used to filter the light from the DLP light source, the mask having pixels configurable to be individually transparent or opaque to portions of the light from the DLP light source. In a build area of the tank, the filtered light may be used to cure the photo-curable liquid resin so as to form a layer of a partially formed object. The operation of the DLP light source may be synchronized with the operation of the mask, such that light from the DLP light source with high intensity is transmitted through the transparent pixels of mask and light from DLP light source with low intensity is blocked by the opaque pixels of mask, minimizing the heating of the mask. Since the resolution of a DLP light source is typically lower than the resolution of the mask, the mask may also be used to enhance the resolution of DLP light source.

These and other embodiments of the invention are more fully described in association with the drawings below.

BRIEF DESCRIPTION OF THE DRAWINGS

The invention is now described, by way of example and without limiting the scope of the invention, with reference to the accompanying drawings which illustrate embodiments of it, in which.

DETAILED DESCRIPTION

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention. Descriptions associated with any one of the figures may be applied to different figures containing like or similar components/steps. While the sequence diagrams each present a series of steps in a certain order, the order of some of the steps may be changed.

Figure 1:
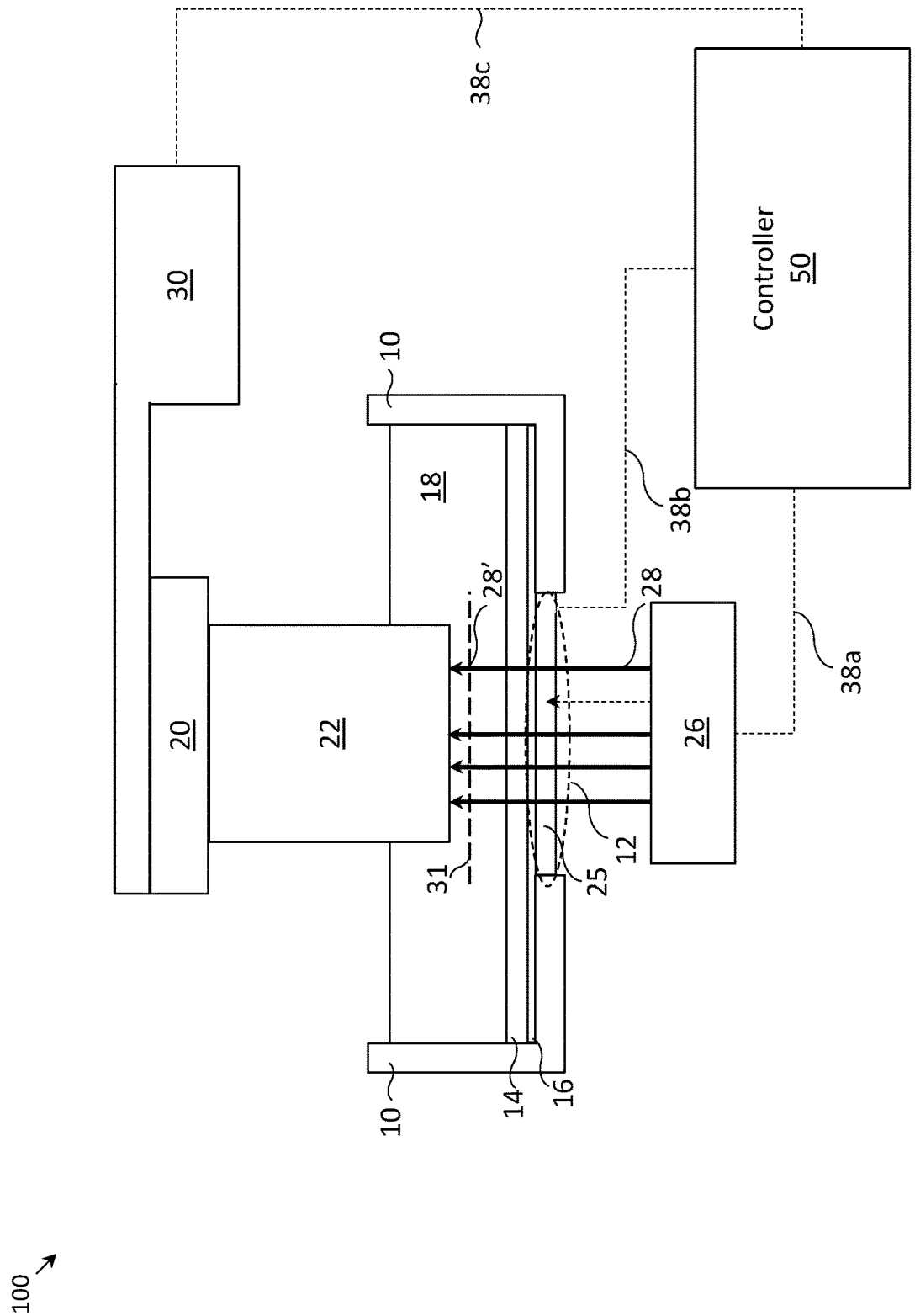
FIG. 1 depicts a schematic cross-section of a 3D printing system in which an object undergoes fabrication in a tank containing a photo-curable liquid resin, in accordance with one embodiment of the invention.

FIG. 1 depicts a cross-section of three-dimensional (3D) printing system 100 (also called a vat polymerization printer), in which electromagnetic radiation (e.g., ultra-violet light) is used to cure photo-curable liquid resin 18 in order to fabricate object 22 (e.g., a 3D object). Object 22 may be fabricated layer by layer; that is, a new layer of object 22 may be formed by photo-curing a layer 31 of liquid resin 18 adjacent to the bottom surface of object 22 (also called the build area), the object may be raised by extractor plate 20, allowing a new layer of liquid resin 18 to be drawn under the newly formed layer; and the process repeated to form additional layers.

The 3D printing system 100 includes tank 10 for containing the liquid resin 18. The bottom of tank 10 includes bottom opening 12 to allow electromagnetic radiation 28 from digital light processing (DLP) light source 26 to enter into tank 10. DLP light source 26 may comprise a DLP light projector, or a digital micromirror device (DMD) that is irradiated by a light source. While one DLP light source is depicted in FIG. 1, it is possible that in other embodiments (not depicted), multiple DLP light sources may be employed to project electromagnetic radiation into tank 10 at the same time, allowing a higher intensity of electromagnetic radiation to be achieved.

An optional radiation-transparent backing member 16 (e.g., borosilicate glass or a toughened glass such as an alkali-aluminosilicate glass of approximately 100 μm thickness) may be used to seal the tank opening 12 (i.e., to prevent the photo-curing liquid polymer 18 from leaking out of tank 10), while at the same time, allowing electromagnetic radiation to enter into tank 10 in order to cure the liquid resin 18.

One challenge faced by 3D printing systems of the present kind is that in addition to adhering to the object 22, newly formed layers tend to adhere to the bottom of tank 10. Consequently, when the extraction plate 20 to which the object is attached is raised by height adjustor 30, the newly formed layer could tear and/or become dissociated from the object 22. To address this issue, a flexible membrane 14 may be disposed adjacent to backing member 16 (if present) or may form the bottom of the tank 10 (if no backing member is used). Flexible membrane 14 may be formed of silicone or another material, and optionally, coated with a non-stick material such as polytetrafluoroethylene (PTFE) to reduce the likelihood for the newly formed layer to adhere to the bottom of tank 10. The flexible membrane 14 is transparent (or nearly so) to the wavelength of radiation emitted by the DLP light source 26 so as to allow that radiation to enter into tank 10 in order to cure the liquid resin 18.

A mask 25 may be disposed adjacent to tank opening 12 to spatially filter the radiation that is incident on layer 31, so that specific regions of the liquid resin 18, that correspond to the cross section of the object 22 being printed, are cured. Mask 25 may be a transmissive spatial light modulator, such as a liquid crystal display (LCD) with a two-dimensional array of addressable pixels. As will be more clearly described in the figures below, certain ones of the pixels may be controlled to be transparent, while others may be controlled to be opaque. Transparent pixels allow radiation to pass through the mask 25 at certain spatial locations of mask 25 and into tank 10, consequently curing portions of the liquid resin 18, while opaque pixels prevent radiation from passing through certain spatial locations of mask 25.

Advantageously, DLP light source 26 may be configured to impart radiation with low intensity (e.g., less than 25% of the peak radiation, less than 10% of the peak radiation, less than 1% of the peak radiation, etc.) on opaque pixels so as to minimize the heating of mask 25 and in turn minimize the heating of resin 18. The radiation on transparent pixels is maintained with a high intensity (e.g., greater than 75% of the peak radiation, greater than 90% of the peak radiation, etc.) as such radiation is needed to cure the resin 18 in build area 31. However, since the resolution of a DLP light source 26 typically is lower than the resolution of mask 25 (e.g., an LCD mask), the above relationship of light intensity to opaque or transparent pixels may not hold for the opaque pixels at the perimeter of transparent pixel regions. For the opaque pixels at the perimeter of transparent pixel regions, the radiation from the DLP light source 26 may still be high and thus the function of those opaque pixels to block light is still carried out. Conceptually, the mask 25 enhances the resolution of DLP light source 26, as described in more detail below in FIG. 2. If not already apparent, such selective radiation of mask 25 (and hence the minimizing of the heating of resin 18) is not possible with conventional light sources that emit a uniform collimated beam of light which radiates all pixels of mask 25 with the same intensity of radiation irrespective of whether the respective pixels are transparent or opaque.

Controller 50 may be communicatively coupled to DLP light source 26, mask 25, and height adjustor 30 via control signal paths 38a, 38b and 38c, respectively (e.g., electrical signal paths). Controller 50 may control the addressable pixels of mask 25 such that the transparent pixels of mask 25 correspond to a cross section of an object to be printed. Similarly, controller 50 may control DLP light source 26 such that portions of the light from DLP light source 26 with high intensity correspond to a cross section of an object to be printed. Importantly, the operation of DLP light source 26 may be synchronized with the operation of mask 25, such that light from DLP light source 26 with high intensity is transmitted through the transparent pixels of mask 25 and light from DLP light source 26 with low intensity is blocked by the opaque pixels of mask 25. Such synchronized control by controller 50 is described in more detail below in FIG. 4.

Controller 50 may also control height adjustor 30 to control the vertical position of height extractor 20, and consequently of object (or partially formed object) 22 that is affixed to height extractor 20. Using height extractor 20, the position of object 22 may be translated in a direction perpendicular to an extent of the flexible membrane 14.

Figure 2:
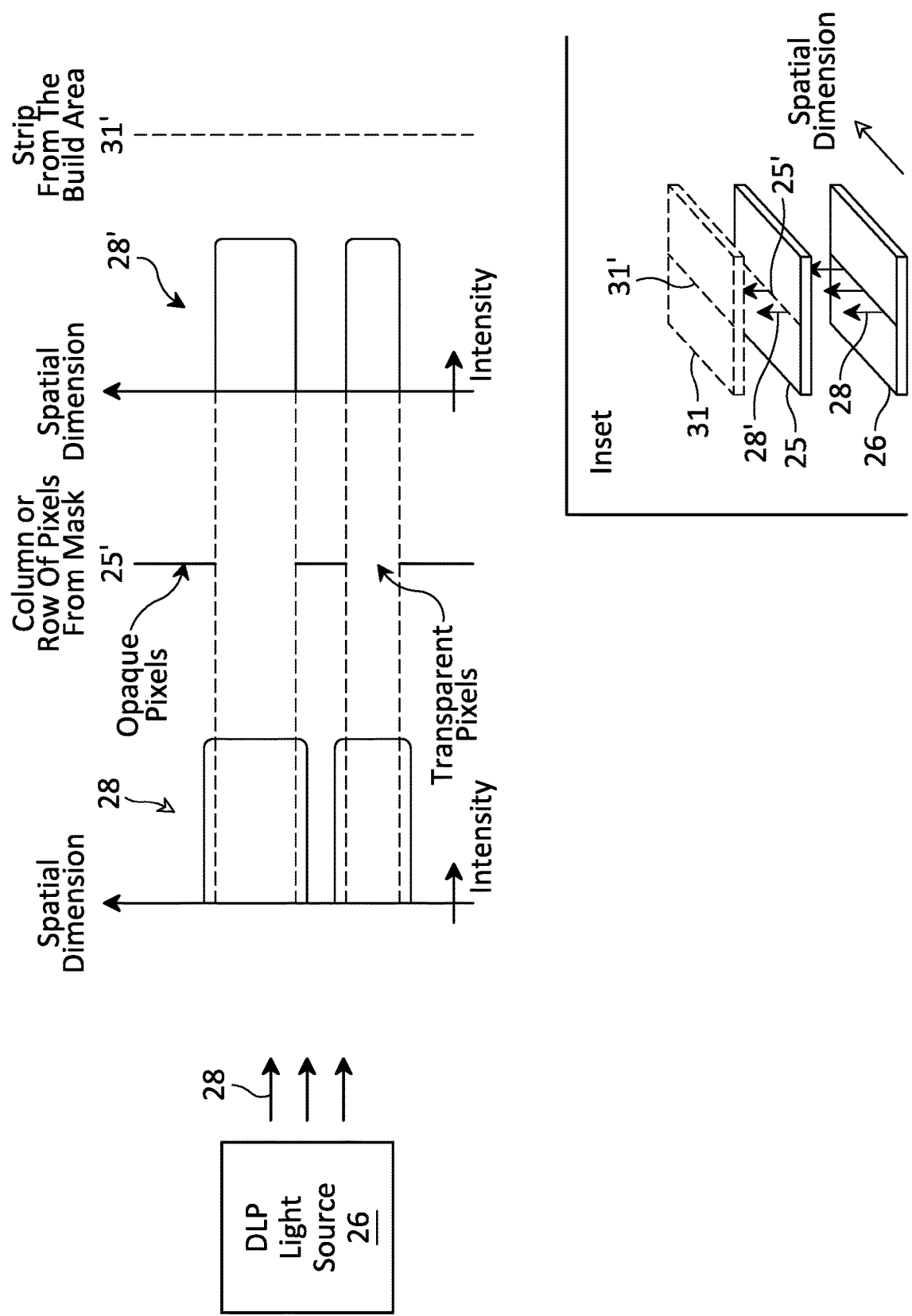
FIG. 2 depicts a schematic to visually represent the light from a digital light processing (DLP) light source (e.g., with varying intensity in the spatial dimension) being filtered by a mask, before the light reaches the build area of the tank of a 3D printing system, in accordance with one embodiment of the invention.
Figure 3:
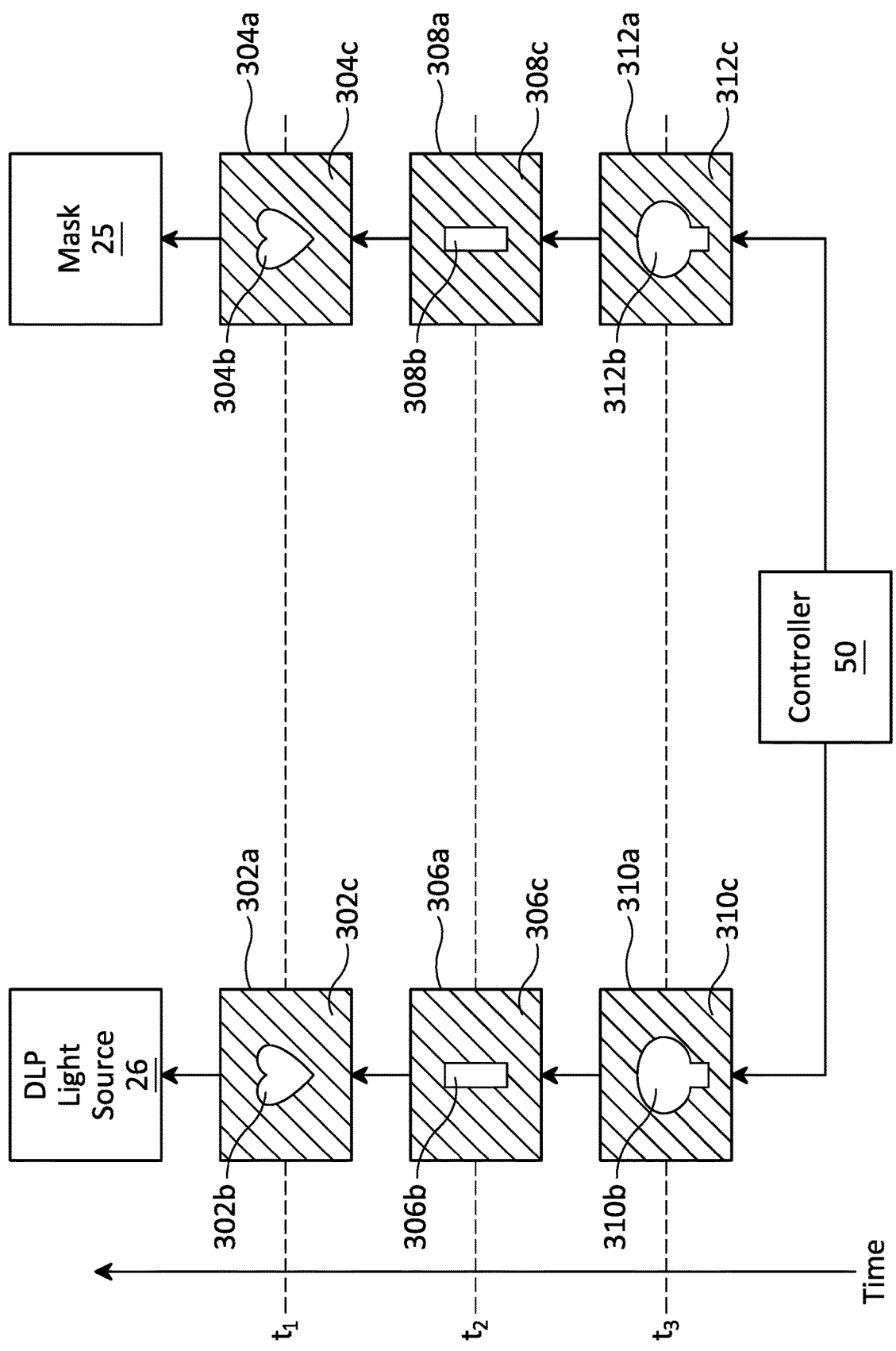
FIG. 3 depicts a schematic to visually explain the synchronized control of the DLP light source and the mask, in accordance with one embodiment of the invention.

FIG. 2 depicts a schematic to visually represent light 28 from DLP light source 26 (e.g., with varying intensity in the spatial dimension) being filtered by mask 25 (more specifically, a column or row of pixels 25' from mask 25), before the filtered light 28' reaches build area 31 (more specifically, strip 31' from build area 31) of tank 10 of the 3D printing system 100. For simplicity of illustration, a two-dimensional slice through the 3D printing system 100 is being illustrated in FIG. 3, as shown by the inset which provides some context to the orientation of the two-dimensional slice. As shown in FIG. 3, light 28 is transmitted from DLP light source 26, the light 28 having varying intensity in the spatial dimension. Light 28 is filtered by mask 25, producing filtered light 28'. Light with high intensity (for the most part) passes through the transparent pixels of mask 25, whereas light with low intensity (for the most part) is blocked by the opaque pixels of mask 25. Notice how the transitions of the light intensity are sharper in filtered light 28', as compared to light 28, illustrating the increased resolution provided by mask 25. The filtered light 28' then cures resin 18 at the build area 31.

FIG. 3 depicts a schematic to visually explain the synchronized control of DLP light source 26 and mask 25. At time instance $t_1$, light pattern 302a (with a high intensity portion 302b and a low intensity portion 302c) is transmitted to DLP light source 26, and mask pattern 304a (with transparent portion 304b and opaque portion 304c) is transmitted to mask 25. The shape of high intensity portion 302b substantially resembles the shape of transparent portion 304b at time instance $t_1$, demonstrating the synchronized control of DLP light source 26 and mask 25 by controller 50. At time instance $t_2$, light pattern 306a (with a high intensity portion 306b and a low intensity portion 306c) is transmitted to DLP light source 26, and mask pattern 308a (with transparent portion 308b and opaque portion 308c) is transmitted to mask 25. The shape of high intensity portion 306b substantially resembles the shape of transparent portion 308b at time instance $t_2$, further demonstrating the synchronized control of DLP light source 26 and mask 25 by controller 50. At time instance $t_3$, light pattern 310a (with a high intensity portion 310b and a low intensity portion 310c) is transmitted to DLP light source 26, and mask pattern 312a (with transparent portion 312b and opaque portion 312c) is transmitted to mask 25. The shape of high intensity portion 310b substantially resembles the shape of transparent portion 312b at time instance $t_3$, further demonstrating the synchronized control of DLP light source 26 and mask 25 by controller 50. For simplicity of illustration, only one high intensity portion was depicted and only one transparent portion was depicted, but it is understood that in practice, one or more high intensity portions and one or more transparent portions may be present.

Figure 4:
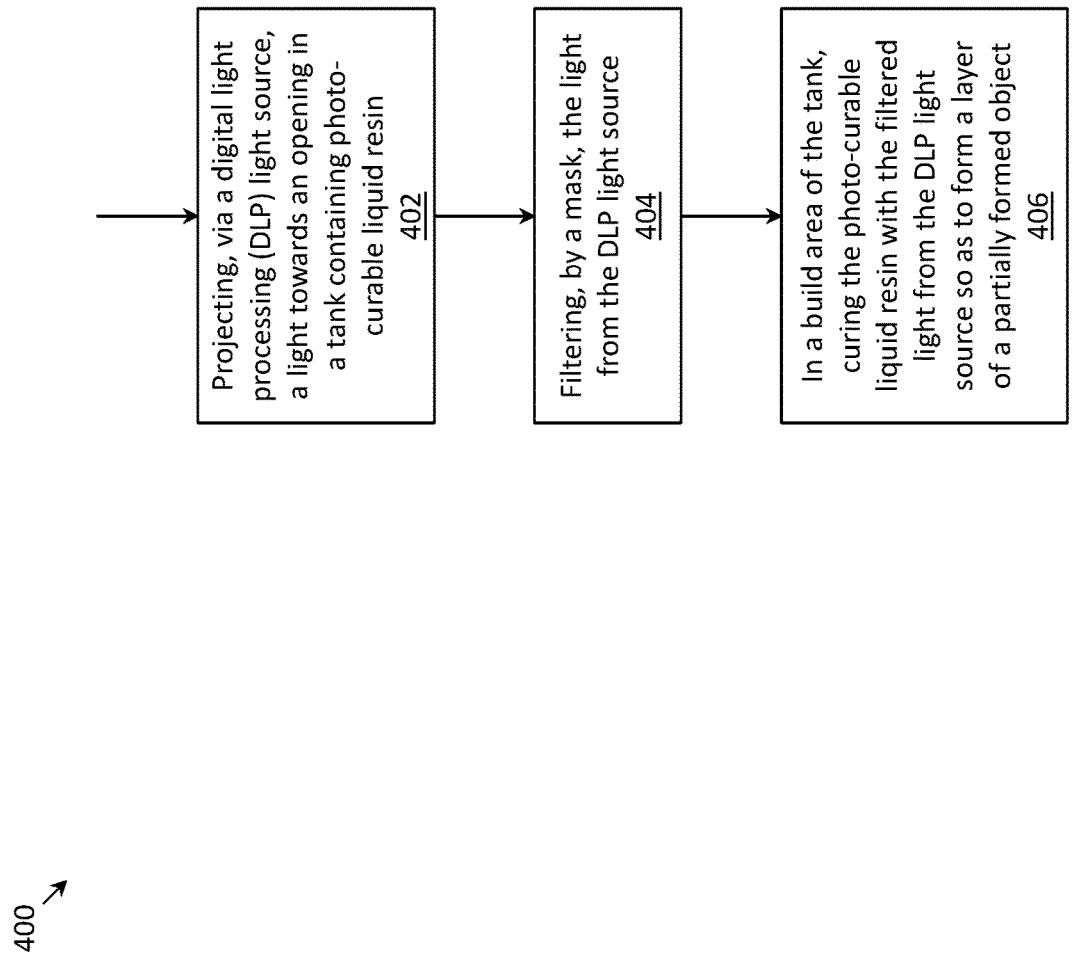
FIG. 4 depicts a flow diagram of a process for printing a layer of a partially formed object using a 3D printing system in which light from a DLP light source is filtered by a mask before curing resin at a build area of a tank of a 3D printing system, in accordance with one embodiment of the invention.

FIG. 4 depicts flow diagram 400 of a process for printing a layer of a partially formed object 22 using 3D printing system 100 in which light from DLP light source 26 is filtered by mask 25 before curing resin 18 at build area 31 of the tank 10. At step 402, light 28 from DLP light source 26 may be projected toward bottom opening 12 of tank 10 containing liquid resin 18. At step 404, mask 25 may be used to filter light 28 from DLP light source 26. As described above, in most instances light with high intensity from DLP light source 26 may be transmitted through the transparent pixels of mask 25, and light with low intensity from DLP light source 26 may be blocked by the opaque pixels of mask 25. However, at the "boundary regions" (i.e., the opaque pixels surrounding regions with transparent pixels), light with high intensity from the DLP light source 26 may also be blocked by the opaque pixels of mask 25, thereby enhancing the resolution of DLP light source 26. At step 406, liquid resin 18 in build area 31 of the tank 10 may be cured by the filtered light 28' from the DLP light source 26 so as to form a layer of a partially formed object 22.

Figure 5:
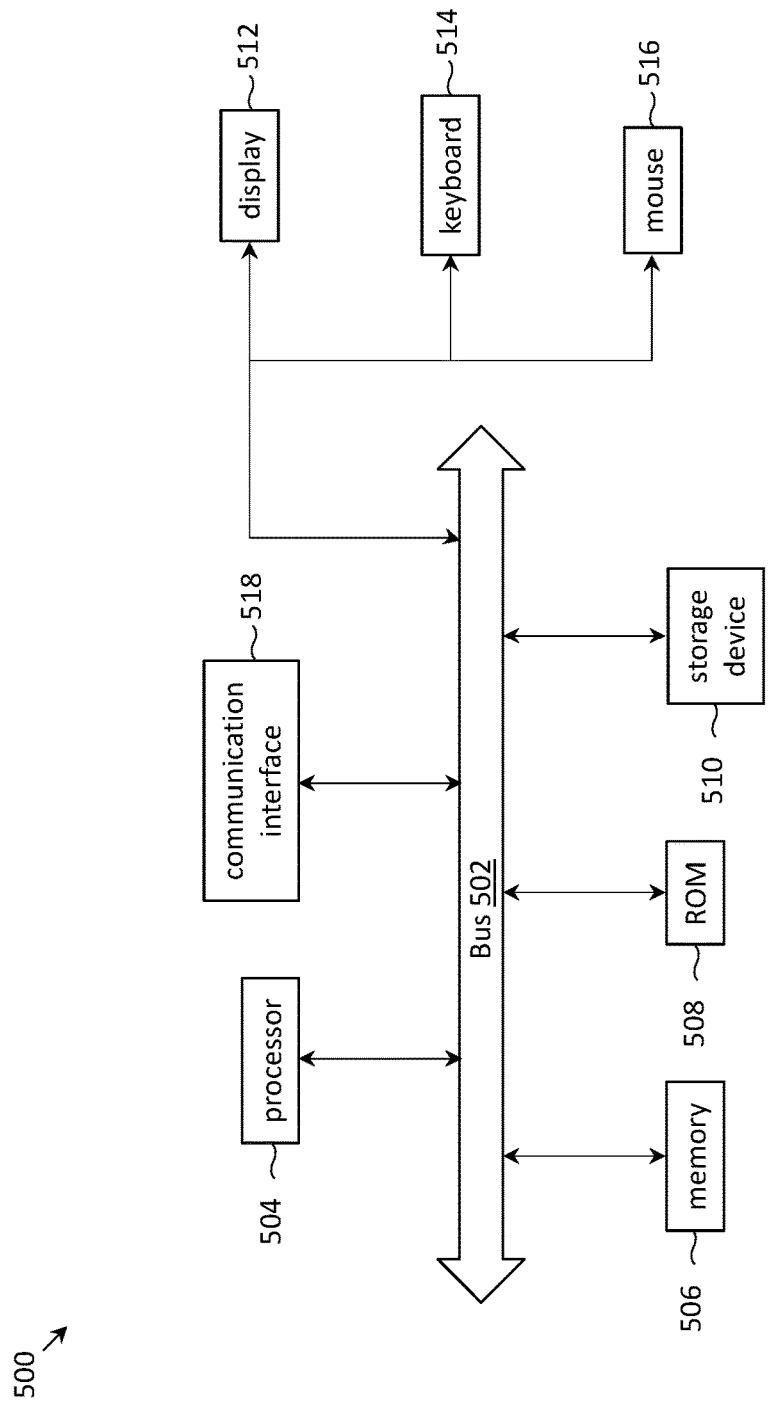
FIG. 5 depicts components of a computer system in which computer readable instructions instantiating the methods of the present invention may be stored and executed.

As is apparent from the foregoing discussion, aspects of the present invention involve the use of various computer systems and computer readable storage media having computer-readable instructions stored thereon. FIG. 5 provides an example of system 500 that may be representative of any of the computing systems (e.g., controller 50) discussed herein. Note, not all of the various computer systems have all of the features of system 500. For example, certain ones of the computer systems discussed above may not include a display inasmuch as the display function may be provided by a client computer communicatively coupled to the computer system or a display function may be unnecessary. Such details are not critical to the present invention.

System 500 includes a bus 502 or other communication mechanism for communicating information, and a processor 504 coupled with the bus 502 for processing information. Computer system 500 also includes a main memory 506, such as a random access memory (RAM) or other dynamic storage device, coupled to the bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to the bus 502 for storing static information and instructions for the processor 504. A storage device 510, for example a hard disk, flash memory-based storage medium, or other storage medium from which processor 504 can read, is provided and coupled to the bus 502 for storing information and instructions (e.g., operating systems, applications programs and the like).

Computer system 500 may be coupled via the bus 502 to a display 512, such as a flat panel display, for displaying information to a computer user. An input device 514, such as a keyboard including alphanumeric and other keys, may be coupled to the bus 502 for communicating information and command selections to the processor 504. Another type of user input device is cursor control device 516, such as a mouse, a trackpad, or similar input device for communicating direction information and command selections to processor 504 and for controlling cursor movement on the display 512. Other user interface devices, such as microphones, speakers, etc. are not shown in detail but may be involved with the receipt of user input and/or presentation of output.

The processes referred to herein may be implemented by processor 504 executing appropriate sequences of computer-readable instructions contained in main memory 506. Such instructions may be read into main memory 506 from another computer-readable medium, such as storage device 510, and execution of the sequences of instructions contained in the main memory 506 causes the processor 504 to perform the associated actions. In alternative embodiments, hard-wired circuitry or firmware-controlled processing units may be used in place of or in combination with processor 504 and its associated computer software instructions to implement the invention. The computer-readable instructions may be rendered in any computer language.

In general, all of the above process descriptions are meant to encompass any series of logical steps performed in a sequence to accomplish a given purpose, which is the hallmark of any computer-executable application. Unless specifically stated otherwise, it should be appreciated that throughout the description of the present invention, use of terms such as "processing", "computing", "calculating", "determining", "displaying", "receiving", "transmitting" or the like, refer to the action and processes of an appropriately programmed computer system, such as computer system 500 or similar electronic computing device, that manipulates and transforms data represented as physical (electronic) quantities within its registers and memories into other data similarly represented as physical quantities within its memories or registers or other such information storage, transmission or display devices.

Computer system 500 also includes a communication interface 518 coupled to the bus 502. Communication interface 518 may provide a two-way data communication channel with a computer network, which provides connectivity to and among the various computer systems discussed above. For example, communication interface 518 may be a local area network (LAN) card to provide a data communication connection to a compatible LAN, which itself is communicatively coupled to the Internet through one or more Internet service provider networks. The precise details of such communication paths are not critical to the present invention. What is important is that computer system 500 can send and receive messages and data through the communication interface 518 and in that way communicate with hosts accessible via the Internet.

Thus, methods and systems for photocuring liquid resin with reduced heat generation using a DLP light source have been described. It is to be understood that the above-description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A vat polymerization printer, comprising:
   a tank configured for containing a photo-curable liquid resin, the tank including a tank opening;
   a digital light processing (DLP) light source configured to project light towards the tank opening;
   a liquid crystal display (LCD) mask disposed between the DLP light source and the tank opening, the mask having pixels configurable to be individually transparent or opaque to portions of the light projected from the DLP light source; and
   a controller configured to control the DLP light source to project the light with varying intensity such that portions of the light with high intensity are transmitted through one or more respective transparent pixel regions of the mask and onto opaque pixels at perimeters of the one or more transparent pixel regions of the mask and portions of the light with low intensity are blocked by respective opaque pixels of the mask.

2. The vat polymerization printer of claim 1, wherein the mask is disposed adjacent to the tank opening.

3. The vat polymerization printer of claim 1, wherein the mask comprises a two-dimensional array of the configurable pixels.

4. The vat polymerization printer of claim 3, wherein the controller is configured to control the DLP light source and the mask.

5. The vat polymerization printer of claim 4, wherein the controller is further configured to synchronize an operation of the DLP light source with an operation of the mask.

6. The vat polymerization printer of claim 1, wherein a spatial resolution of the mask is greater than a spatial resolution of the DLP light source.

7. The vat polymerization printer of claim 1, further comprising a radiation-transparent flexible membrane disposed across the tank opening.

8. The vat polymerization printer of claim 7, further comprising an extraction plate configured to translate a partially formed object within the tank in a direction perpendicular to an extent of the radiation-transparent flexible membrane.

9. The vat polymerization printer of claim 1, wherein the DLP light source comprises a DLP projector.

10. The vat polymerization printer of claim 1, wherein the DLP light source comprises a digital micromirror device (DMD).

11. The vat polymerization printer of claim 1, wherein the mask is configured to enhance a resolution of the DLP light source.

12. A method, comprising:
   projecting, via a digital light processing (DLP) light source, light towards an opening in a tank containing photo-curable liquid resin;
   filtering, by a liquid crystal display (LCD) mask, the light from the DLP light source, the mask having pixels configurable to be individually transparent or opaque to portions of the light projected from the DLP light source; and
   in a build area of the tank, curing the photo-curable liquid resin with the filtered light from the DLP light source so as to form a layer of a partially formed object,
   wherein the light is projected from the DLP light source with varying intensity such that portions of the light with high intensity are transmitted through one or more respective transparent pixel regions of the mask and onto opaque pixels at perimeters of the one or more transparent pixel regions of the mask and portions of the light with low intensity are blocked by respective opaque pixels of the mask.

13. The method of claim 12, further comprising translating, by an extraction plate, the partially formed object in a direction perpendicular to an extent of the mask.

14. The method of claim 12, wherein the mask comprises a two-dimensional array of the configurable pixels.

15. The method of claim 12, wherein the projection of light from the DLP light source is synchronized with the filtering of the light by the mask.

16. The method of claim 12, wherein a spatial resolution of the mask is greater than a spatial resolution of the DLP light source.

17. The method of claim 12, wherein the DLP light source comprises a DLP projector.

18. The method of claim 12, wherein the DLP light source comprises a digital micromirror device (DMD).

19. The method of claim 12, wherein the individually transparent or opaque pixels are provided such that the projection of light from the DLP light source imparts less than 10% of a peak radiation of the projected light onto the opaque pixels of the mask and greater than 90% of the peak radiation of the projected light onto the transparent pixels.

20. The method of claim 12, wherein the mask enhances a resolution of the DLP light source.

* * * * *